(12) United States Patent
Ezaki et al.

(10) Patent No.: US 7,188,247 B2
(45) Date of Patent: Mar. 6, 2007

(54) SYSTEM AND METHOD OF CONTENT COPY CONTROL

(75) Inventors: Tadashi Ezaki, Tokyo (JP); Jun Hirai, Tokyo (JP); Hideo Sato, Tokyo (JP)

(73) Assignee: Sony Corporation (JP)

( * ) Notice: Subject to any disclaimer, the term of this patent is extended or adjusted under 35 U.S.C. 154(b) by 1095 days.

(21) Appl. No.: 09/870,207

(22) Filed: May 30, 2001

(65) Prior Publication Data

US 2002/0078356 A1    Jun. 20, 2002

(30) Foreign Application Priority Data

May 31, 2000  (JP)  ............................ P2000-162319
Apr. 2, 2001  (JP)  ............................ P2001-103153

(51) Int. Cl.
*H04L 9/00*  (2006.01)
(52) U.S. Cl. ...................................... 713/176; 713/193
(58) Field of Classification Search ................ 713/176, 713/165
See application file for complete search history.

(56) References Cited

U.S. PATENT DOCUMENTS

| | | | |
|---|---|---|---|
| 6,320,829 B1 * | 11/2001 | Matsumoto et al. | 369/47.12 |
| 6,571,220 B1 * | 5/2003 | Ogino et al. | 705/51 |
| 6,633,723 B1 * | 10/2003 | Kuroda et al. | 386/94 |
| 6,687,411 B1 * | 2/2004 | Miura et al. | 382/250 |
| 6,707,774 B1 * | 3/2004 | Kuroda et al. | 369/53.21 |

\* cited by examiner

*Primary Examiner*—Gilberto Barron
*Assistant Examiner*—Venkat Perungavoor
(74) *Attorney, Agent, or Firm*—Lerner, David, Littenberg, Krumholz & Mentlik, LLP

(57) ABSTRACT

A calculator system for performing duplication of contents does not necessarily perform screening, i.e., electronic watermark detection, rather, contents copy control information can be obtained otherwise. For example, in the event of copying a CD regarding which it is known beforehand that there is no electronic watermark inserted in the contents, the electronic watermark detection processing itself can be skipped as long as the CD can be confirmed to be such, thereby reducing the amount of time necessary for copying. Electronic watermark inspecting processing with heavy computation loads is performed vicariously for judging whether or not duplication of contents is permissible.

38 Claims, 11 Drawing Sheets

SYSTEM AND METHOD OF CONTENT COPY CONTROL

CROSS-REFERENCE TO RELATED APPLICATIONS

The present application claims priority from Japanese Application Nos. P2000-162319 filed May 31, 2000 and P2001-103153 filed Apr. 2, 2001, the disclosures of which are hereby incorporated by reference herein.

BACKGROUND OF THE INVENTION

The present invention relates to electronic watermarking technology for embedding information in contents such as images or music, in a practically visually or audibly indiscernible manner, and particularly relates to electronic watermark inspecting technology for inspecting electronic watermarks embedded in various types of contents such as pictures, music, broadcast programs, and so forth.

More specifically, the present invention relates to electronic watermark inspecting technology for judging whether or not making duplicates of contents is permissible according to the results of inspections of electronic watermarks embedded in contents, and particularly relates to electronic watermark inspecting technology wherein electronic watermark inspecting processing with heavy computation loads is performed vicariously.

A copyright is a relative exclusive right to the use of copyrighted material, and is a type of intangible property rights. The term "copyrighted material" as used here refers to creative expressions of ideas or emotions, pertaining to the realms of literature, science, art, or music. Copyrights are protected by the copyright laws in each nation, and by international treaties such as the Berne Convention for the Protection of Literary and Artistic Works, the Universal Copyright Convention, and so forth. For example, digitized text, computer programs, digitized music contents, picture contents, broadcast program contents, and like media are also copyrighted material, and should be appropriately protected under copyright laws.

It is extremely rare that only the copyright holder of copyrighted material exercises use thereof, usually the copyright holder gives permission for another party to use the copyrighted material, for a set price. Accordingly, in order to guarantee protection of copyrights, it becomes necessary to prevent unauthorized use of copyrighted material by others such as making duplicates of the copyrighted material without permission.

The history of copyright protection dates back to the 15th century, and is said to have originated with the invention of the art of printing. However, the tremendous advancements in electric and electronic arts in recent years has facilitated duplication of copyrighted material, and accordingly the state of matters regarding copyrights has been constantly changing.

Duplicating or tampering with data or contents in digital format is extremely easy, to the extent that it may be said that such data or contents are nakedly exposed to the danger of copyright infringement. Accordingly, simply making copyright laws or other such legal restrictions tougher is insufficient, and there seems to be a need to support authorized use of copyrighted material of eliminate unauthorized use thereof from a technological perspective, thereby increasing protection of copyrights.

One example of means for combating unauthorized copying in the field of digital contents is the "electronic watermark" technology, also known as "digital watermarking" or "data hiding". An "electronic watermark" means embedding information in contents such as images or music in a practically visually or audibly indiscernible manner (e.g., see "Data Hiding Technology supporting Electronic Watermarking (parts 1 and 2), carried in the Feb. 24 and Mar. 10, 1997, issues of Nikkei Electronics).

For example, in 1998, a group centered around major USA record companies established a forum called SDMI (Secure Digital Music Interactive). SDMI stipulates a function called "screening", as a system for protecting copyrights with portable music players. Screening consists of a system for inspecting on a memory recorder of a portable device whether or not copying of the contents is permissible or not, and an agreement has already been reached to use electronic watermarking. Electronic watermarking can be used to screen such that no more copies can be made from contents illegitimately distributed or from contents already copied once (or a predetermined number of times), for example.

FIG. 1 illustrates a function block diagram for performing screening processing as envisioned by SDMI. As shown in the figure, music contents read from recording media such as a CD or MD, of music contents received via communication medium, is first subjected to screening (i.e., inspected for electronic watermark), thereby checking whether or not copying thereof is permissible, following which the contents are subjected to compression enciphering with a system called LCM (Licensed SDMI Compliant Module) and then copied to the portable device (PD). The term "portable device" here refers to a portable device/player having functions of expanding and deciphering the compressed and enciphered contents, and playing the contents.

A screening processing system such as shown in FIG. 1 is installed in a calculator system such as a personal computer for example, and is connected with the portable device via, for example, general-purpose bus cables such as ilink or USB (Universal Serial Bus), or near-range wireless data communication such as IrDA (Infrared Data Association) or Bluetooth technology.

Electronic watermarking is an art of inserting additional data in music contents to a degree that the additional data is not audibly perceivable, and generally, around 12 bits of data can be inserted in a period of around 15 seconds.

However, there is a problem in that detecting electronic watermarks is computation-intensive, thereby requiring time. For example, attempting to detect electronic watermarks throughout the entire music contents would require ⅓ to ½ of the actual playing time of the music.

Now, studying an arrangement wherein the above screening processing is installed in a personal computer and music contents are copied from a CD to a portable device, this comprises the following processes:

(1) Data is read out from the CD, and is copied to a hard disk as a WAV format (or other format) file.

(2) The WAV file is inspected, to detect electronic watermarks from the entire music data.

(3) In the event that copy forbidding information of "No More Copy" is detected from the electronic watermark, copy processing of the music contents is terminated at that point. On the other hand, in the event that such copy forbidding information is not detected, the detecting processing is continued to the end of the music piece, and in the event that such copy forbidding information is not detected to the very end, the flow proceeds to the subsequent step (4).

(4) The WAV file is subjected to bandwidth compression by ATRAC3 (Adaptive Transform Acoustic Coding 3), for example.

(5) The data subjected to bandwidth compression is enciphered, and temporarily copied onto a hard disk.

(6) The compressed and enciphered file on the hard disk is transferred to the portable device.

Here, despite the fact that screening an attempted copy from a conventional CD to which no watermark has been inserted is meaningless, all data is consequently checked in the above step (3), taking extra time for detecting. This would be very unhandy in the event that the user is attempting to hurriedly copy a favorite piece of music from a CD to a portable device before leaving home, for example.

SUMMARY OF THE INVENTION

The present invention has been made in light of the above problems and, accordingly, it is an object of the present invention to provide an excellent electronic watermark detecting technology capable of detecting electronic watermarks embedded in contents.

It is another object of the present invention to provide an excellent electronic watermark detecting technology capable of judging whether duplication of contents is permissible according to detected electronic watermarks embedded in the contents.

It is a further object of the present invention to provide an excellent electronic watermark detecting technology capable of vicariously performing electronic watermark inspecting processing with heavy computation loads so as to judge whether or not duplication of contents is permissible, thereby reducing the time required for the overall copying operation.

To this end, according to a first aspect of the present invention, a system for managing the copying of contents to external equipment consists of a first reader operable to read in contents to be copied; a second reader operable to read in identification information of the contents; a database storing information regarding whether copying is permissible for each of the contents; an electronic watermark inspecting unit operable to inspect electronic watermarks inserted into the contents and to produce inspection results; and a controller operable to control copying of the contents to the external equipment; wherein the controller searches the database based on at least one of the identification information and attribute information of the contents, and in the event that a matching record exists, controls copying according to the content of the matching record, and in the event that a matching record does not exist, controls copying according to the inspection results.

The controller may compress and encipher the contents and then copy the contents to the external equipment. The controller and the database are preferably connected via a safe communication path which can be established via procedures of, for example, electronic verification and key exchange.

The system may further include an obtaining unit operable to obtain the attribute information of the contents. In such a case, the attribute information may be data comprising at least a part of the contents that has been clipped, or may be a hash value for at least a part of the contents. Or, the attribute information may be a characteristic value or a characteristic quantity relating to the contents, such as contents envelope values, cycles equivalent to rhythm, the manner in which a spectrum expands, or the like.

According to a second aspect of the present invention, a method for managing copying of contents to external equipment consists of reading in contents to be copied; reading in identification information of the contents; maintaining a database of information regarding whether copying is permissible for each of the contents; searching the database based on at least one of the identification information and attribute information of the contents; and, in the event that a matching record exists in the database, controlling copying according to the contents of the matching record, and in the event that a matching record does not exist in the database, inspecting the contents for an electronic watermark inserted therein to produce inspection results, and controlling copying according to the inspection results.

In the copy control step, the contents may be compressed and enciphered and then copied to the external equipment.

Also, the database searching step is preferably performed via a safe communication path which can be established via procedures of, for example, electronic verification and key exchange.

The method according to the second aspect of the present invention may further include obtaining the attribute information of the contents to be copied. In such a case, the attribute information may be data comprising at least a part of the contents that has been clipped, or a hash value for at least a part of the contents. Or, the attribute information may be a characteristic value or a characteristic quantity relating to the contents, such as contents envelope values, cycles equivalent to rhythm, the manner in which a spectrum expands, or the like.

According to a third aspect of the present invention, an information processing device for executing copying of contents to external equipment includes a first reader operable to read in contents to be copied; a second reader operable to read in identification information of the contents; an electronic watermark inspecting unit operable to inspect electronic watermarks inserted into the contents and to produce inspection results; and a controller operable to communicate with an external server and to control copying of the contents to the external equipment; wherein the controller makes inquiry to the external server based on at least one of the identification information and attribute information of the contents, and, according to the inquiry results, either executes copying of the contents, or inspects the contents with the electronic watermark inspecting unit and controls copying according to the inspection results.

The controller may compress and encipher the contents and then copy the contents to the external equipment. Also, the connection between the controller and the external server is preferably made via a safe communication path which can be established via procedures of, for example, electronic verification and key exchange.

The information processing device according to the third aspect of the present invention may further include an obtaining unit operable to obtain the attribute information of the contents. In this case, the attribute information may be data comprising at least a part of the contents that has been clipped, or may be a hash value for at least a part of the contents. Or, the attribute information may be a characteristic value or a characteristic quantity relating to the contents, such as contents envelope values, cycles equivalent to rhythm, the manner in which a spectrum expands, or the like.

According to a fourth aspect of the present invention, a method for executing copying of contents to external equipment includes reading in contents to be copied; reading in identification information of the contents; making inquiry to an external server based on at least one of the identification information and attribute information of the contents; and, according to the inquiry results, either copying the contents, or inspecting the contents for an electronic watermark inserted therein to produce inspection results, and controlling copying according to the inspection results.

In the copy control step, the contents may be compressed and enciphered and then copied to the external equipment.

Also, the inquiry to the external server is preferably made via a safe communication path which can be established via procedures of, for example, electronic verification and key exchange.

The information processing method according to the fourth aspect of the present invention may further include obtaining the attribute information of the contents to be copied. In such a case, the attribute information may be data comprising at least a part of the contents that has been clipped, or may be a hash value for at least a part of the contents. Or, the attribute information may be a characteristic value or a characteristic quantity relating to the contents, such as contents envelope values, cycles equivalent to rhythm, the manner in which a spectrum expands, or the like.

According to a fifth aspect of the present invention, a server for managing copying of contents consists of a database which can be searched based on at least one of identification information and attribute information for contents; a receiver operable to receive inquiries regarding whether copying of the contents is permitted; searching means for searching the database in response to the inquiries to obtain search results; and a transmitter operable to transmit the search results to inquiring parties.

With the server according to the fifth aspect, the transmitter preferably transmits the search results to the inquiring parties via a safe communication path which can be established via procedures of, for example, electronic verification and key exchange.

The attribute information may be data comprising at least a part of the contents that has been clipped, or may be a hash value for at least a part of the contents. Or, the attribute information may be a characteristic value or a characteristic quantity relating to the contents, such as contents envelope values, cycles equivalent to rhythm, the manner in which a spectrum expands, or the like.

According to a sixth aspect of the present invention, a recording medium is recorded with a computer readable program for managing copying of contents to external equipment. The program includes reading in contents to be copied; reading in identification information of the contents; obtaining attribute information of the contents; maintaining a database of information regarding whether copying is permissible for the contents; searching the database based on at least one of the identification information and the attribute information; and, in the event that a matching record exists in the database, controlling copying according to the content of the matching record, and, in the event that a matching record does not exist in the database, inspecting the contents for an electronic watermark therein to produce inspection results, and controlling copying according to the inspection results.

According to a seventh aspect of the present invention, a recording medium is recorded with a computer readable program for executing copying of contents to external equipment. The program includes reading in contents to be copied; reading in identification information of the contents; obtaining attribute information of the contents; making inquiry to an external server based on at least one of the identification information and the attribute information of the contents; and, according to the inquiry results, either copying the contents, or inspecting the contents for an electronic watermark inserted therein to produce inspection results, and controlling copying according to the inspection results.

The recording medium according to the sixth and seventh aspects of the present invention is a medium for providing the program in a computer readable format to a general purpose computer system capable of executing various types of program code. The medium is a detachable and portable storing medium, such as a CD (Compact Disk), FD (Floppy Disk), MO (Magneto-Optical disk), or the like. Also, it is technologically possible to supply the program to a particular computer system via a communication path, such as a network (whether wireless or otherwise).

Such a recording medium defines a structural or functional cooperative relationship between the program and the storing medium for realizing the functions of the particular program on the computer system. In other words, installing a particular program in the computer system via the recording medium according to the sixth and seventh aspects of the present invention manifests the cooperative action thereof on the computer system, thereby obtaining the same operations and advantages as the contents copy managing system and method, and the information processing device and method, according to the first through fourth aspects of the present invention.

According to an eighth aspect of the present invention, a system for managing copying of contents to external equipment consists of a first reader operable to read in contents to be copied; a second reader operable to read in identification information of the contents; a database storing information regarding whether copying is permissible for each of the contents; an electronic watermark inspecting unit operable to inspect electronic watermarks inserted into the contents and to produce inspection results; an orthogonal conversion unit operable to perform orthogonal conversion of the contents to produce converted results; an encoding compression unit operable to subject the converted contents to quantization and Huffman encoding to produce encoded and compressed contents; an enciphering unit operable to encipher the encoded and compressed contents to produce enciphered contents; and a controller operable to control copying of the enciphered contents to the external equipment; wherein the controller searches the database based on at least one of the identification information and an orthogonal conversion value of the contents or a hash value thereof, and, in the event that a matching record exists, controls copying of the enciphered contents according to the content of the matching record, and, in the event that a matching record does not exist, controls copying of the enciphered contents according to the inspection results. "Orthogonal conversion" as referred to herein includes, for example, mDCT (Modified Discrete Cosine Transform), DCT (Discrete Cosine Transform), Wavelet (a waveform analyzing technology developed by Summus Limited of the USA), and so forth.

According to a ninth aspect of the present invention, a method for managing copying of contents to external equipment includes reading in contents to be copied; reading in identification information of the contents; performing orthogonal conversion of the contents to produce converted contents; subjecting the converted contents to quantization and Huffman encoding to produce encoded and compressed contents; enciphering the encoded and compressed contents to produce enciphered contents; maintaining a database of information regarding whether copying is permissible for each of the contents; searching the database based on at least one of the identification information and an orthogonal conversion value of the contents or a hash value thereof; and, in the event that a matching record exists in the database, controlling copying of the enciphered contents according to the content of the matching record, and, in the event that a matching record does not exist in the database, inspecting the contents for an electronic watermark inserted therein to produce inspection results, and controlling copying of the enciphered contents according to the inspection results.

According to a tenth aspect of the present invention, an information processing device for executing copying of contents to external equipment consists of a first reader operable to read in contents to be copied; a second reader operable to read in identification information of the contents; an electronic watermark inspecting unit operable to inspect electronic watermarks inserted into the contents and to produce inspection results; an orthogonal conversion unit operable to perform orthogonal conversion of the contents to produce converted contents; an encoding compression unit operable to subject the converted contents to quantization and Huffman encoding to produce encoded and compressed contents; an enciphering unit operable to encipher the encoded and compressed contents to produce enciphered contents; and a controller operable to control copying of the enciphered contents to the external equipment; wherein the controller makes inquiry to an external server based on at least one of the identification information and an orthogonal conversion value of the contents or a hash value thereof, and, according to the inquiry results, either copies the enciphered contents, or controls copying of the enciphered contents according to the inspection results.

According to an eleventh aspect of the present invention, an information processing method for executing copying of contents to external equipment consists of reading in contents to be copied; reading in identification information of the contents; performing orthogonal conversion of the contents to produce converted contents; subjecting the converted contents to quantization and Huffman encoding to produce encoded and compressed contents; enciphering the encoded and compressed contents to produce enciphered contents; making inquiry to an external server based on at least one of the identification information and an orthogonal conversion value of the contents or a hash value thereof; and, according to the inquiry results, either copying the enciphered contents, or inspecting the contents for an electronic watermark inserted therein to produce inspection results, and controlling copying of the enciphered contents according to the inspection results.

With the present invention, the calculator system for performing duplication of contents does not necessarily perform screening, i.e., electronic watermark detection, with contents copy control information being obtainable by other means. For example, in the event of copying a CD regarding which it is known beforehand that there is no electronic watermark inserted in the contents, the electronic watermark detection processing itself can be skipped as long as the CD can be confirmed to be such, thereby reducing the amount of time necessary for copying.

That is to say, there is no need to detect electronic watermarks from the data, so processing time is reduced and ease of use improves.

Also, even with cases of detecting electronic watermarks, there is no need to perform detection over the entirety of the contents (e.g., music piece), so processing time is reduced and ease of use improves.

Further objects, characteristics and advantages of the present invention will become more apparent from the following embodiments and detailed descriptions made with reference to the attached drawings.

DETAILED DESCRIPTION

The following is a detailed description of embodiments of the present invention, with reference to the drawings.

Figure 1:
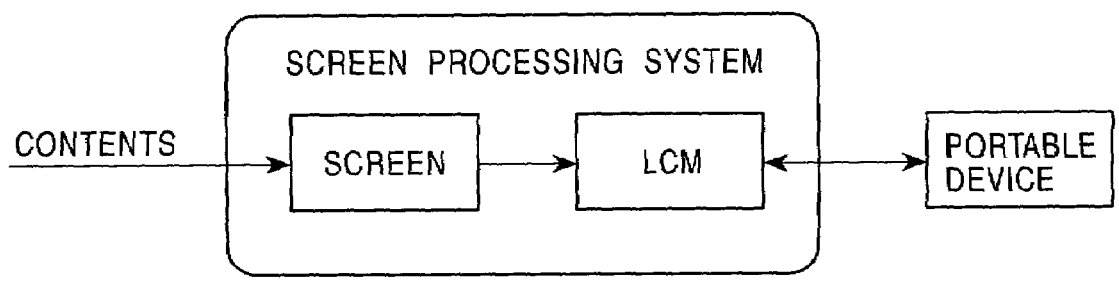
FIG. 1 is a function block diagram for realizing the screening processing envisioned by SDMI.
Figure 2:
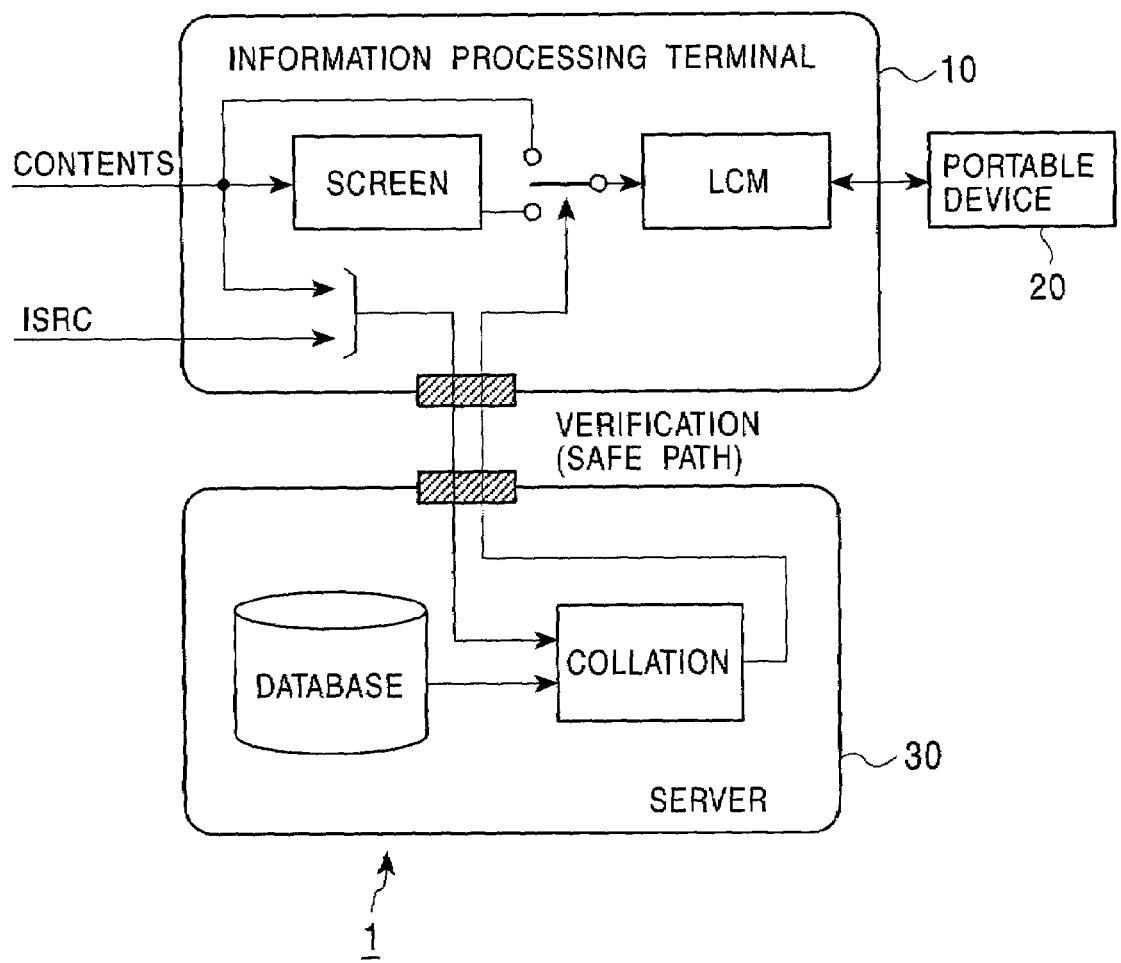
FIG. 2 is a diagram schematically illustrating the overall configuration of a contents copy managing system 1 according to an embodiment of the present invention.

FIG. 2 schematically illustrates the overall configuration of a contents copy managing system 1 according to an embodiment of the present invention.

This contents copy managing system 1 comprises an information processing terminal 10 for copying contents such as music or the like to a portable device 20, and a server 30 which provides vicarious services of electronic watermark detection processing relating to contents for the information processing terminal 10. The term "portable device" here refers to a portable device/player having functions of expanding and deciphering the compressed and enciphered contents, and playing the contents.

The information processing terminal 10 is realized by, for example, starting a predetermined application on a personal computer (PC) within the home (described later). The personal computer is an IBM PC/AT compatible model or a later model thereof, for example.

Description will proceed under the assumption that the information processing terminal 10 performs verification with the server 30, and that a safe communication path has been secured.

The information processing terminal 10 reads out music data from a CD mounted to a CD-ROM drive (not shown), and copies the music data to the portable device 20.

The music data read out from the CD is temporarily saved in a hard disk (not shown) as a WAV file.

Also, at the time of reading out the music data from the CD, an identification information ISRC (International Standard Recording Code) uniquely appropriated to the music piece is extracted from the TOC (Table of Contents) area.

SDMI (Secure Digital Music Interactive) stipulates that screening, i.e., inspection of electronic watermark information, is to be performed at the time of copying music data to other devices or media, as described above. However, with the present embodiment, the information processing terminal 10 makes an inquiry to the server 30 before starting the screening processing. The ISRC (or other information whereby the contents can be identified) of the music piece to be copied are included in this inquiry.

The server 30 manages an electronic watermark information database regarding each of the music pieces, and can make a search of the entry of each of the music pieces with the ISRC. Accordingly, upon receiving the inquiry from the information processing terminal 10, collation of the entry of the music piece of interest is attempted, based on the ISRC contained in the inquiry. The collation results are then returned to the information processing terminal 10 which is the requesting party.

Upon receiving the response to the inquiry, the information processing terminal 10 proceeds with processing according to the collation results. For example, in the event that the information processing terminal 10 has received results to the effect that the media does not contain an electronic watermark, there is no meaning in screening, so the electronic watermark detection processing is skipped, and copying of the music contents to the portable device can be started.

Also, in the event of using the ISRC as described above, there is the danger that, at the time of reading out the ISRC from the CD-ROM drive with the information processing terminal 10, the path may be tampered with, and the ISRC substituted with another ISRC not containing an electronic watermark (or the ISRC of a CD regarding which it is known that copying can be performed) Accordingly, in addition to the ISRC, other information relating to the data contents on the media, such as total playing time or the like, may be added, thereby eliminating the danger falsely assumed identity. However, if there is technology which allows identification information such as ISRC to be safely obtained from the media, there is no need to transmit such attributes information.

Also, clipping a part of the music and sending the data to the server 30, or further sampling two or more places in the music piece and sending these to the server 30, may be used for collation. Arrangements can be made wherein the place to be sampled is randomly changed each time so that the place to be sampled cannot be specified, thereby eliminating the danger falsely assumed identity.

Also, direct collation of music samples can lead to relatively great amounts of data, thereby increasing the load on communication. Accordingly, an arrangement may be made wherein a hash value of part or all of the music data dearanged is taken, and this value is transferred to the server 30 side for collation, thus confirming whether or not there is an electronic watermark therein.

Note that hash functions are used for digital signatures and the like, and are of a nature such that tampering with a part of the data put into the hash function greatly changes the results, so prediction of the hash function is difficult, and tampering can be readily discovered. Also, hash functions have unidirectional function properties, so tampering to match the results is also difficult. Such hash functions are a known art.

Or, techniques may be listed as examples wherein characteristic values or characteristic quantities in the music data are computed, and used for collation at the server 30. For example arrangements may be made wherein data such as envelope values, cycles equivalent to rhythm, the manner in which a spectrum expands, or the like may be analyzed, and such computation results transferred to the server 30 for collation.

According to the configuration and operating properties of a contents copy managing system 1 such as shown in FIG. 2, in the event of copying music contents from a CD to the portable device 20 with the information processing terminal 10, electronic watermark detection processing is skipped for CDs which do not contain electronic watermarks from the beginning, so the ease of use thereof increases.

Next, description will be made regarding the processing procedures for copying music contents from a CD to the portable device 20 with the information processing terminal 10 of the contents copy managing system 1 according to a first embodiment of the present invention. As described above, according to this embodiment, the information processing terminal 10 can omit the electronic watermark detection processing by making inquiry to the server 30 side database.

Figure 3:
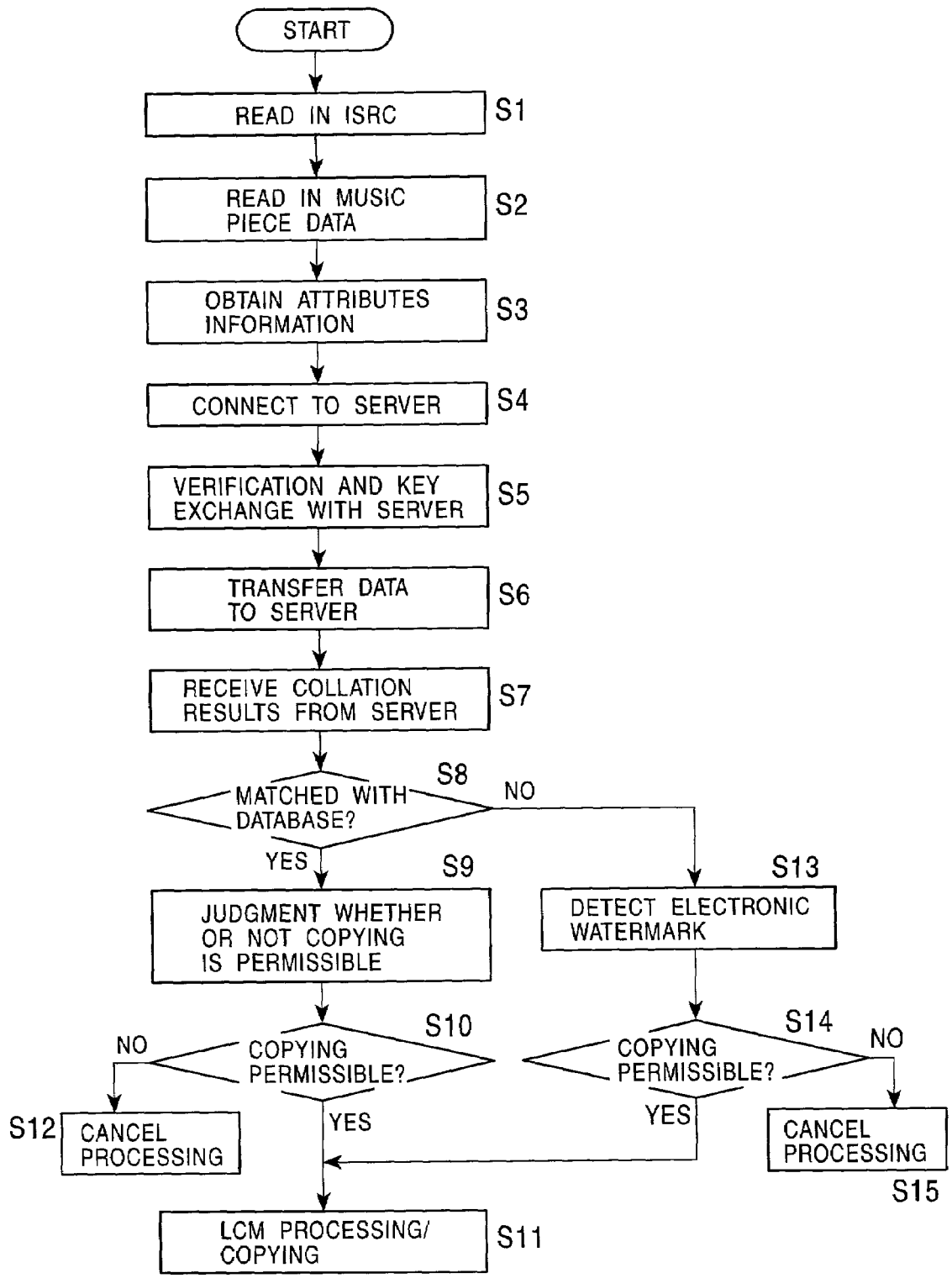
FIG. 3 is a flowchart illustrating the processing procedures for copying music data on a CD on an information processing terminal 10 to a portable device 20 in the contents copy managing system 1 according to a first embodiment of the present invention, with the copying being executed at the side of the information processing terminal 10.

FIG. 3 illustrates the processing procedures executed on the information processing terminal 10, in the form of a flowchart. The following description will be made with reference to this flowchart.

First, the ISRC or equivalent contents identification information is obtained from a CD mounted to a CD-ROM drive (not shown) (step S1).

Generally, a data area such as a TOC is provided on the CD, so that ISRCs and other contents attributes information can be recorded. The ISRC is unique identification information appropriated to each CD title, and is configured of 12 digits of alphanumeric characters.

Next, desired music piece data is read out from the CD, and is copied to a hard disk (not shown) within the terminal 10 (step S2).

Next, the attributes information is obtained from the music piece on the hard disk (step S3). Attributes information as described here is the total playing time of the music piece, particular characteristic values (quantities) extracted from the music piece by computation, and so forth. Envelope values, cycles equivalent to rhythm, the manner in which a spectrum expands, and other like analysis values may serve as the characteristic values. Such attributes information is used as supplementary identification information other than the ISRC, and can prevent falsely assumed identities by unauthorized users. However, if a technique which allows identification information such as ISRCs to be safely extracted from the media is established, there is no need to transmit attributes information.

Next, connection is made to the server 30 to which inquiry is to be made (step S4), and further performing verification and key exchange with the server 30 (step S5) secures a safe communication path with the server 30.

Verification methods using shared keys or public keys can be used for the verification, and the protocol thereof has already been standardized by ISO (the International Organization for Standardization). At the time of issuing a verification request from one device, a random number string is also sent out, and the other device deciphers the random number with a predetermined key and replies. At the one device, this is solved using a predetermined key, and checking whether or not this matches with the original random number verifies whether or not the other party has a shared key or a reliable key, or in other words, whether or not the other party is the intended party.

Following establishing a safe communication path, the information processing terminal 10 transfers the ISRC code read in step S1 and the attributes information obtained in step S3 to the server 30 side, and requests an investigation of the CD (step S6).

In response to the CD investigation request, the server 30 side searches the database therein based on the ISRC code and judges whether or not the record exists therein, and further judges whether or not the attributes information matches, and returns the results thereof to the information processing terminal 10 (Step S7). The processing performed at the server 30 side will be described later in detail.

At the information processing terminal 10 side, judgment is made regarding whether or not copying to the portable device 20 is permissible or not, based on the response from the server 30 side.

In the event that the contents of the reply indicate that the record of interest exists within the database (step S8), this means that the CD mounted has been registered to the database and the data inserted by electronic watermark is known, so screening, i.e., the electronic watermark detection processing, can be omitted. In this case, only judgment whether or not copying is permissible from the CD is performed (steps S9, S10). In the event that the registered CD permits only one copy to be made, a check should be made in step S9 regarding whether or not the media mounted is a CD-R.

In the event that copying is permissible, the flow proceeds to step S91, performs LCM music piece data compression (bandwidth compressing by ATRAC3) and enciphering, and then copying to the portable device 20 is executed. On the other hand, in the event that copying is not permissible, the flow proceeds to step S92, and the copying process is cancelled.

On the other hand, in the event that the judgment in step S8 indicates that the record of interest does not exist in the database at the server 30 side, i.e., that the CD mounted is not a registered CD, there is no other option but to perform screening, i.e., electronic watermark detection processing (step S13).

In the event that the results of electronic watermark detection and of judgment regarding whether or not copying is permissible indicate that copying is permissible, LCM music piece data compression (bandwidth compressing by ATRAC3) and enciphering is performed, and copying to the portable device 20 is executed (step S14 R step S11). On the other hand, in the event that copying is not permissible, the flow proceeds to step S15, and the copying process is cancelled.

Incidentally, in the event that the CD-ROM drive for reading out the music data is sufficiently reliable (i.e., such as in cases wherein a particular entity certifies a certain level of security, etc.), the system even more preferably comprises an arrangement wherein ISRC data and the fact that the CD is a proper CD can be safely notified, by the drive and the information processing terminal 10 proper performing verification and key exchange.

Figure 4:
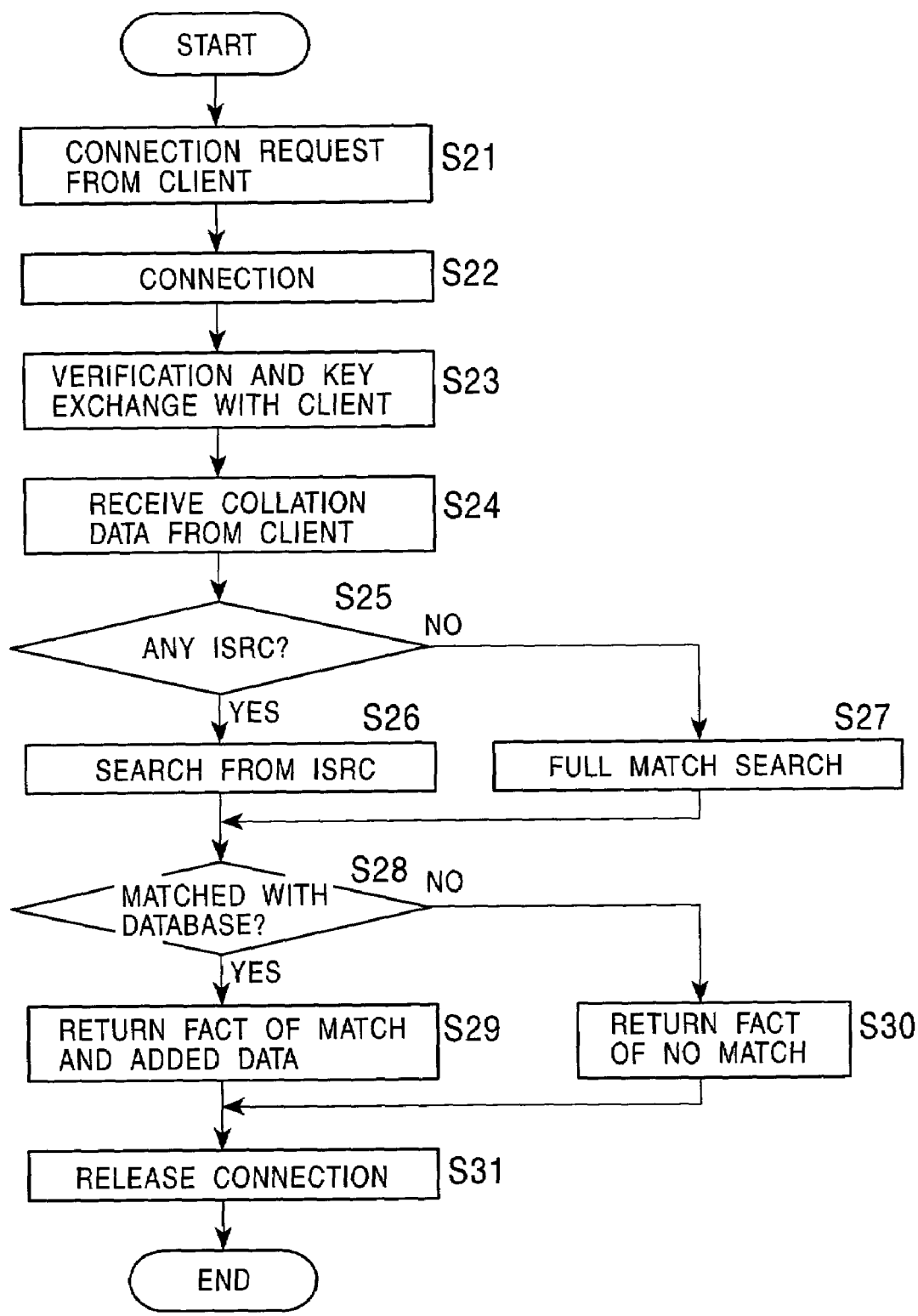
FIG. 4 is a flowchart illustrating the processing procedures for copying music data on a CD on the information processing terminal 10 to the portable device 20 in the contents copy managing system 1 according to the first embodiment of the present invention, with the copying being executed at the side of a server 30.

Also, FIG. 4 illustrates the processing procedures executed at the server 30 side in response to the inquiry from the information processing terminal 10 which performs the processing procedures shown in FIG. 3, in the form of a flowchart. The following description will be made with reference to this flowchart.

First, in response to a connection request from a client, i.e., the information processing terminal 10 (step S21), connection processing is performed (step S22). Further, performing verification and key exchange with the information processing terminal 10 (step S23) secures a safe communication path with the information processing terminal 10 (as described above).

Next, collation data sent from the information processing terminal 10 is received (step S24). The collation data contains ISRC code relating to the music piece and attributes data thereof. Attributes information as described here is the total playing time of the music piece, or particular characteristic values extracted from the music piece such as envelope values, cycles equivalent to rhythm, the manner in which a spectrum expands.

The server 30 checks whether or not an ISRC is contained in the received data (step S25), and in the event that an ISRC is contained therein, searches the database for the ISRC (step S26), and in the event that an ISRC is not contained therein, searches the database for a full match, and finds a record wherein attributes information such as characteristic values and the like match (step S27).

Judgment is made whether or not the search of the database has found a record from the database which matches the collation data (step S28).

In the event that a matching record exists, added data is added thereto and a reply is made to the information processing terminal 10 to that effect (step S29). Copy control information (e.g., "copy from CD-R impermissible", etc.) may be included in the added data.

On the other hand, in the event that a matching record does not exist, and a reply is made to the information processing terminal 10 to that effect (step S30).

Then, the connection with the information processing terminal 10 is released (step S31), and the entire present processing routine ends.

With the example shown in FIGS. 3 and 4, the information processing terminal 10 inquires of the server 30 side whether or not the CD mounted is a registered CD, and the information processing terminal 10 judges whether or not copying is permissible (steps S9 and S10 in FIG. 3). Conversely, an arrangement may be made wherein the server 30, in response to the inquiry from the information processing terminal 10 side, further judges whether or not copying is permissible, and makes a reply regarding this.

Figure 5:
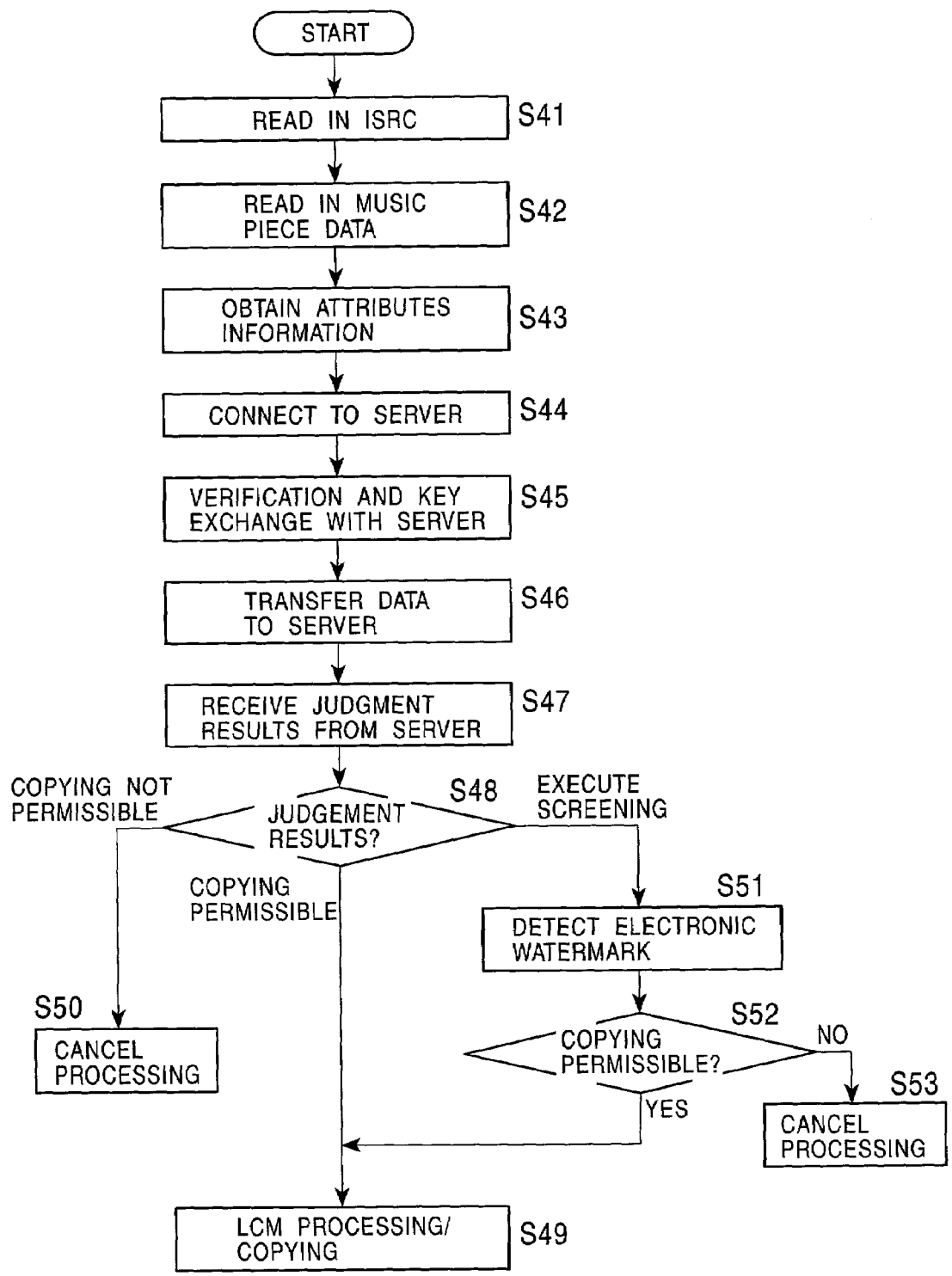
FIG. 5 is a flowchart illustrating another example of the processing procedures for copying music data on a CD on the information processing terminal 10 to the portable device 20 in the contents copy managing system 1 according to a first embodiment of the present invention, with the copying being executed at the side of the information processing terminal 10.
Figure 6:
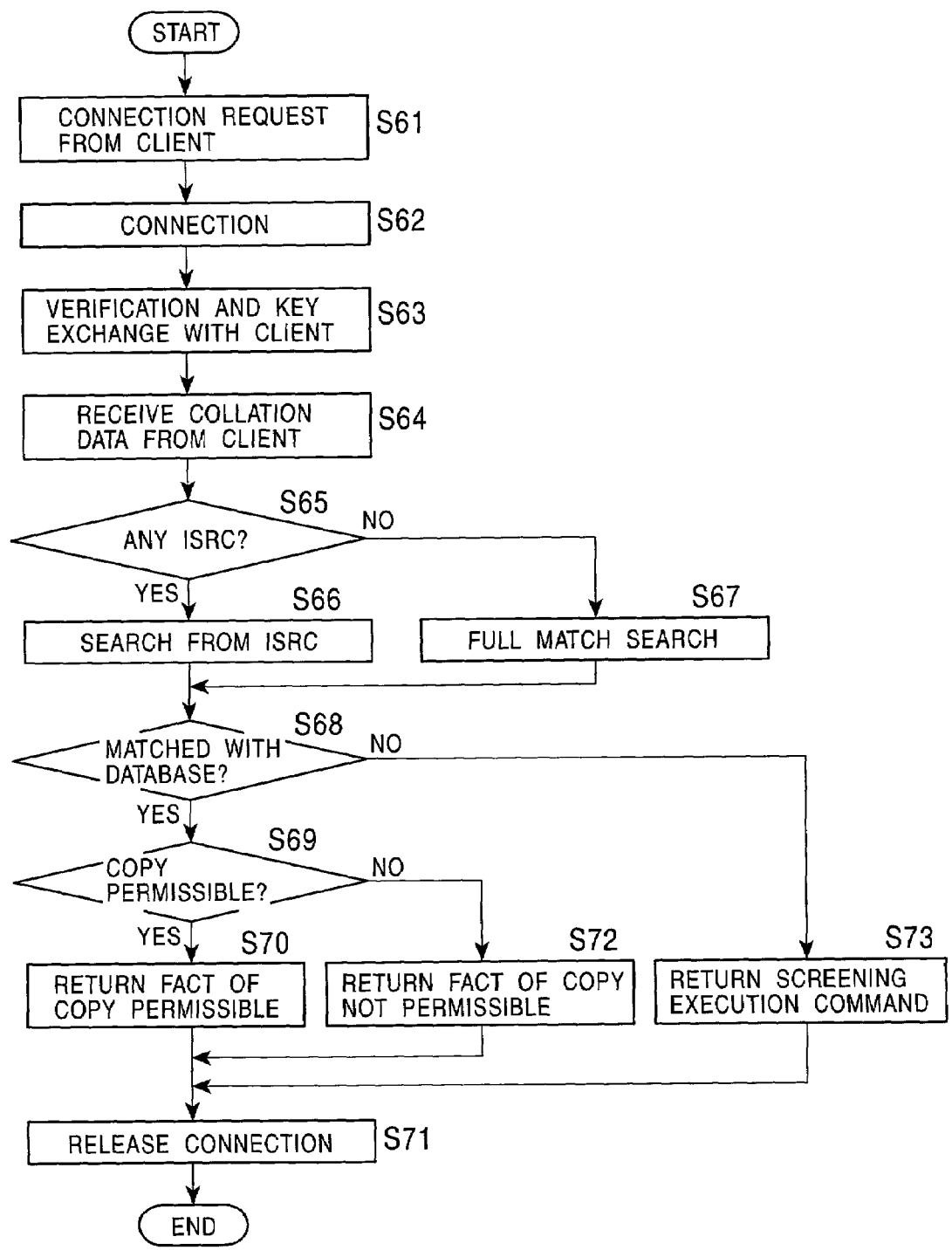
FIG. 6 is a flowchart illustrating another example of the processing procedures for copying music data on a CD on the information processing terminal 10 to the portable device 20 in the contents copy managing system 1 according to the first embodiment of the present invention, with the copying being executed at the side of the server 30.

FIGS. 5 and 6 illustrate the processing procedures executed at the information processing terminal 10 and the server 30 side in the latter arrangement, in the form of a flowchart. The following description will be made with reference to these flowcharts.

At the information processing terminal 10 side, first, the ISRC or equivalent contents identification information is obtained from a CD mounted to a CD-ROM drive (not shown) (step S41).

Next, desired music piece data is read out from the CD, and is copied to a hard disk (not shown) within the terminal 10 (step S42).

Next, the attributes information is obtained from the music piece on the hard disk (step S43). Attributes information as described here is the total playing time of the music piece, particular characteristic values (quantities) extracted from the music piece by computation, and so forth. Envelope values, cycles equivalent to rhythm, the manner in which a spectrum expands, and other like analysis values may serve as the characteristic values. Such attributes information is used as supplementary identification information other than the ISRC, and can prevent falsely assumed identities by unauthorized users. However, if a technique which allows identification information such as ISRCs to be safely extracted from the media is established, there is no need to transmit attributes information.

Next, connection is made to the server 30 to which inquiry is to be made (step S44), and further performing verification and key exchange with the server 30 (step S45) secures a safe communication path with the server 30.

Then, the information processing terminal 10 transfers the ISRC code and the attributes information to the server 30 side, and requests judgment of whether or not copying is permissible (step S46). For this judgment, the information processing terminal 10 also transmits along with this accompanying information such as whether or not the CD mounted is a CD-R, and so forth.

In response to the copy permissible/impermissible judgment request, the server 30 side searches the database therein based on the ISRC code and judges whether or not the record exists therein, and further judges whether or not the attributes information matches, and returns the results thereof to the information processing terminal 10 (Step S47). The processing performed at the server 30 side will be described later in detail.

At the information processing terminal 10 side, judgment is made regarding whether or not copying to the portable device 20 is permissible or not, based on the response from the server 30 side (step S48).

In the event that the judgment results of the server 30 are "copying permissible", the flow proceeds to step S49, performs LCM music piece data compression and enciphering, and then copying to the portable device 20 is executed.

On the other hand, in the event that the judgment results of the server 30 are "copying not permissible", the flow proceeds to step S50, and the copying process is cancelled.

Also, in the event that the judgment results of the server 30 are "execute screening", there is no other option but to perform electronic watermark detection processing (step S51). In the event that the results of electronic watermark detection and of judgment regarding whether or not copying is permissible indicate that copying is permissible, LCM music piece data compression (bandwidth compressing by ATRAC3) and enciphering is performed, and copying to the portable device 20 is executed (step S52 R step S49). On the other hand, in the event that copying is not permissible, the flow proceeds to step S53, and the copying process is cancelled.

On the other hand, in response to a connection request from a client, i.e., the information processing terminal 10 (step S61), connection processing is performed at the server 30 side (step S62). Further, performing verification and key exchange with the information processing terminal 10 (step S63) secures a safe communication path with the information processing terminal 10.

Next, collation data sent from the information processing terminal 10 is received (step S64). The collation data contains ISRC code relating to the music piece and attributes data thereof. Attributes information as described here is the total playing time of the music piece, or particular characteristic values extracted from the music piece such as envelope values, cycles equivalent to rhythm, the manner in which a spectrum expands. Also, accompanying information such as whether or not the CD mounted is a CD-R, is received along with this.

The server 30 checks whether or not an ISRC is contained in the received data (step S65), and in the event that an ISRC is contained therein, searches the database for the ISRC (step S66), and in the event that an ISRC is not contained therein, searches the database for a full match, and finds a record wherein attributes information such as characteristic values and the like match (step S67).

Judgment is made whether or not the search of the database has found a record from the database which matches the collation data (step S68).

In the event that a matching record exists, whether of not copying is permissible is judged, based on the description within the record, and so forth (step S69) Also, whether of not copying is permissible may be judged based on added data such as "whether CD-R or not" sent from the information processing terminal 10.

In the event that copying is permissible, "copying permissible" is returned to the information processing terminal 10, and in the event that copying is not permissible, "copying not permissible" is returned thereto (step S72).

Also, in the event that a matching record does not exist in the database (step S68), omitting of the screening process is not allowed for the information processing terminal 10, so "execute screening" is returned to the information processing terminal 10 (step S73).

Then, the connection with the information processing terminal 10 is released (step S71), and the entire present processing routine ends.

Figure 7:
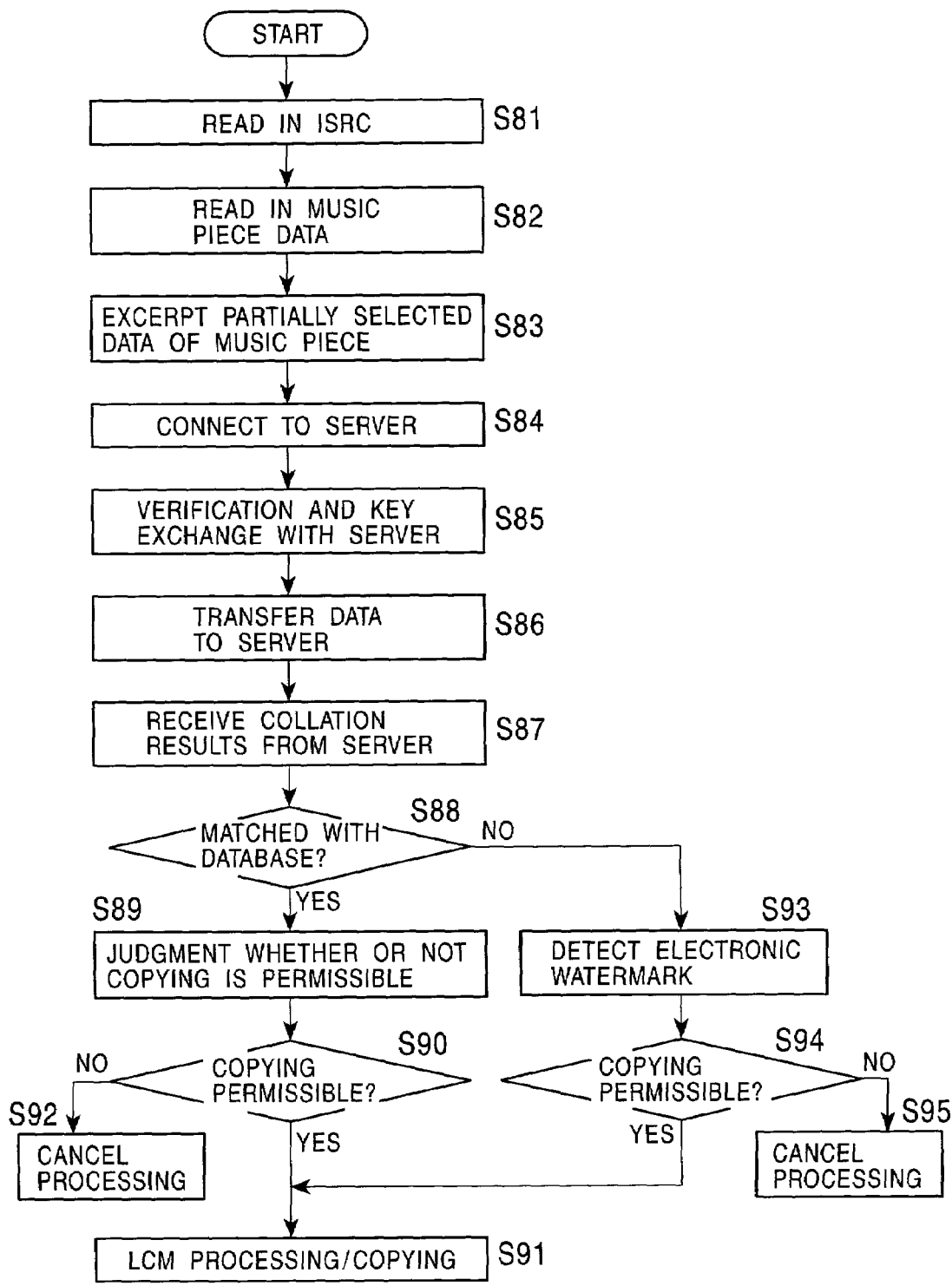
FIG. 7 is a flowchart illustrating another example of the processing procedures executed on the information processing terminal 10, for omitting the electronic watermark detection processing by making inquiry to a database at the side of the server 30.

FIG. 7 illustrates the yet another example of processing procedures executed at the information processing terminal 10 for omitting the electronic watermark detecting processing by making an inquiry to the database at the server 30 side, in the form of a flowchart.

In the event that only the ISRC is used for collation processing with the database, there is the danger that, at the time of reading out the ISRC from the CD-ROM drive with the information processing terminal 10, the path may be tampered with, and the ISRC substituted with another ISRC not containing an electronic watermark (or the ISRC of a CD regarding which it is known that copying can be performed). Accordingly, with the example shown in FIG. 7, collation is made whether or not this is the CD, by making reference to a part of the music data. The following description will be made with reference to this flowchart.

First, the ISRC or equivalent contents identification information is obtained from a CD mounted to a CD-ROM drive (not shown) (step S81).

Next, desired music piece data is read out from the CD, and is copied to a hard disk (not shown) within the terminal 10 (step S82).

Next, a certain number of seconds of actual data is selected and extracted from the music piece data on the hard disk from one or multiple random positions, and the data position information (how many bytes from the start, how many seconds into playing time, etc.) of the data is also obtained, as attributes information (step S83). The position for extracting the actual data may be fixed, but preferably is random in order to eliminate the danger of data substitution by unauthorized users.

Next, connection is made to the server 30 to which inquiry is to be made (step S84), and further performing verification and key exchange with the server 30 (step S85) secures a safe communication path with the server 30.

Then, the information processing terminal 10 transfers the ISRC code read in step S81 and the attributes information obtained in step S83 to the server 30 side, and requests an investigation of the CD (step S86).

In response to the CD investigation request, the server 30 side searches the database therein based on the ISRC code and judges whether or not the record exists therein, and further judges whether or not the attributes information matches, and returns the results thereof to the information processing terminal 10 (Step S87). The processing procedures performed at the server 30 are the same as that described with reference to FIG. 4 except that the collation is made with the clipped actual data rather than attributes information, and accordingly description thereof will be omitted here.

At the information processing terminal 10 side, judgment is made regarding whether or not copying to the portable device 20 is permissible or not, based on the response from the server 30 side.

In the event that the contents of the reply indicate that the record of interest exists within the database (step S88), this means that the CD mounted has been registered to the database and the data inserted by electronic watermark is known, so screening, i.e., the electronic watermark detection processing, can be omitted. In this case, only judgment whether or not copying is permissible from the CD is performed (steps S89, S90). In the event that the registered CD permits only one copy to be made, a check should be made in step S89 regarding whether or not the media mounted is a CD-R.

In the event that copying is permissible, the flow proceeds to step S91, performs LCM music piece data compression (bandwidth compressing by ATRAC3) and enciphering, and then copying to the portable device 20 is executed. On the other hand, in the event that copying is not permissible, the flow proceeds to step S12, and the copying process is cancelled.

On the other hand, in the event that the judgment in step S88 indicates that the record of interest does not exist in the database at the server 30 side, i.e., that the CD mounted is not a registered CD, there is no other option but to perform screening, i.e., electronic watermark detection processing (step S93).

In the event that the results of electronic watermark detection and of judgment regarding whether or not copying is permissible indicate that copying is permissible, LCM music piece data compression (bandwidth compressing by ATRAC3) and enciphering is performed, and copying to the portable device 20 is executed (step S94 R step S91). On the other hand, in the event that copying is not permissible, the flow proceeds to step S95, and the copying process is cancelled.

Figure 8:
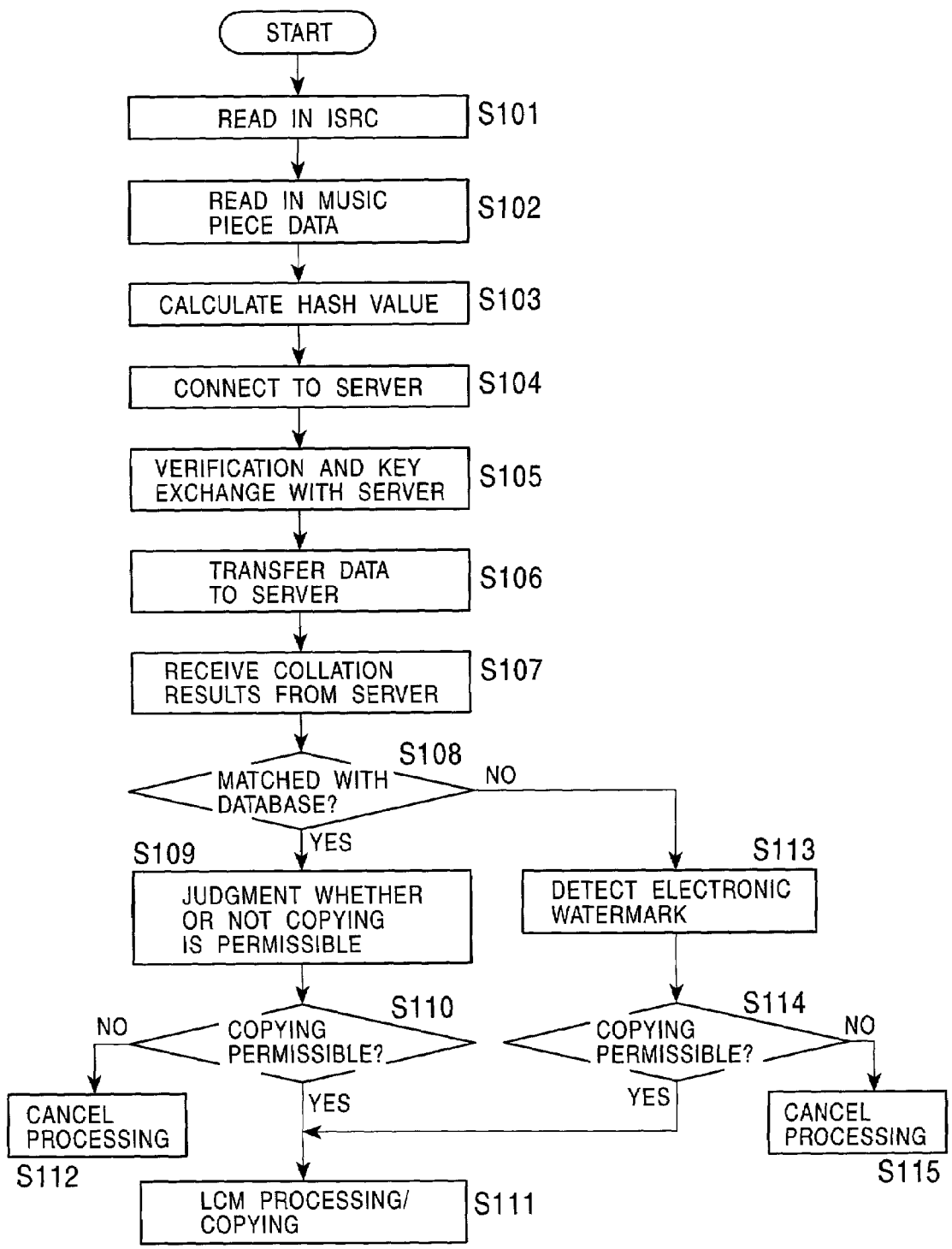
FIG. 8 is a flowchart illustrating yet another example of the processing procedures executed on the information processing terminal 10, for omitting the electronic watermark detection processing by making inquiry to the database at the side of the server 30.

FIG. 8 illustrates the yet another example of processing procedures executed at the information processing terminal 10 for omitting the electronic watermark detecting processing by making an inquiry to the database at the server 30 side, in the form of a flowchart.

With the example shown in FIG. 8, reference is made to a hash value obtained by subjecting all (or part) of the music piece data to a hash function, thereby performing collation whether or not this is the CD.

Now, a hash function is used to compress a data string and replace it with another data string. Generally, hash functions are of a nature such that tampering with even a part of the data put into the hash function greatly changes the results, so prediction of the hash function is difficult and tampering can be readily discovered, and also hash functions have unidirectional function properties, so tampering to match the results is also difficult, as is publicly known. Currently, an algorithm called SHA-1 is disclosed.

The following description will be made with reference to the flowchart shown in FIG. 8.

First, the ISRC or equivalent contents identification information is obtained from a CD mounted to a CD-ROM drive (not shown) (step S101).

Next, desired music piece data is read out from the CD, and is copied to a hard disk (not shown) within the terminal 10 (step S102).

Next, a hash function is applied to the entire music piece data on the hard disk and the hash function thereof is calculated, which is temporarily saved as attributes information (step S103).

Next, connection is made to the server 30 to which inquiry is to be made (step S104), and further performing verification and key exchange with the server 30 (step S105) secures a safe communication path with the server 30.

Then, the information processing terminal 10 transfers the ISRC code read in step S101 and the attributes information obtained in step S103 to the server 30 side, and requests an investigation of the CD (step S106).

In response to the CD investigation request, the server 30 side searches the database therein based on the ISRC code and judges whether or not the record exists therein, and further judges whether or not the hash value thereof matches, and returns the results thereof to the information processing terminal 10 (Step S107).

Unlike the example shown in FIG. 7, the example shown in FIG. 8 allows inspection of the entire music piece for tampering, since the hash value of the entire data is transmitted to the server 30 for collation, and thus conformation can be made regarding whether or not there has been substitution or other like unauthorized processing applied to the data in the CD. Also, hash values are what are transmitted, so the communication load for transmitting data for the entire music piece is light. Further, all that is necessary for the server 30 to store is the hash values, rather than the entire music piece, so storage capacity can be conserved. For example, with SHA-1, 160 bits of data are output per 512 bits, so the hash value of the entire music piece can be obtained by accumulative calculation thereof.

At the information processing terminal 10 side, judgment is made regarding whether or not copying to the portable device 20 is permissible or not, based on the response from the server 30 side.

In the event that the contents of the reply indicate that the record of interest exists within the database (step S108), this means that the CD mounted has been registered to the database and the data inserted by electronic watermark is known, so screening, i.e., the electronic watermark detection processing, can be omitted. In this case, only judgment whether or not copying is permissible from the CD is performed (steps S109, S110). In the event that the registered CD permits only one copy to be made, a check should be made in step S109 regarding whether or not the media mounted is a CD-R.

In the event that copying is permissible, the flow proceeds to step S111, performs LCM music piece data compression (bandwidth compressing by ATRAC3) and enciphering, and then copying to the portable device 20 is executed. On the other hand, in the event that copying is not permissible, the flow proceeds to step S112, and the copying process is cancelled.

On the other hand, in the event that the judgment in step S108 indicates that the record of interest does not exist in the database at the server 30 side, i.e., that the CD mounted is not a registered CD, there is no other option but to perform screening, i.e., electronic watermark detection processing (step S113).

In the event that the results of electronic watermark detection and of judgment regarding whether or not copying is permissible indicate that copying is permissible, LCM music piece data compression (bandwidth compressing by ATRAC3) and enciphering is performed, and copying to the portable device 20 is executed (step S114 R step S111). On the other hand, in the event that copying is not permissible, the flow proceeds to step S115, and the copying process is cancelled.

With all of the embodiments described so far, the information processing terminal 10 first confirms that the music piece read in from the CD can be copied, and then proceeds to the compression and enciphering of the data contents and the copying process for copying to the portable device 20. Conversely, an arrangement can be made wherein confirmation processing of whether or not copying is permissible is performed as a part of the data contents compression and enciphering process.

Figure 9:
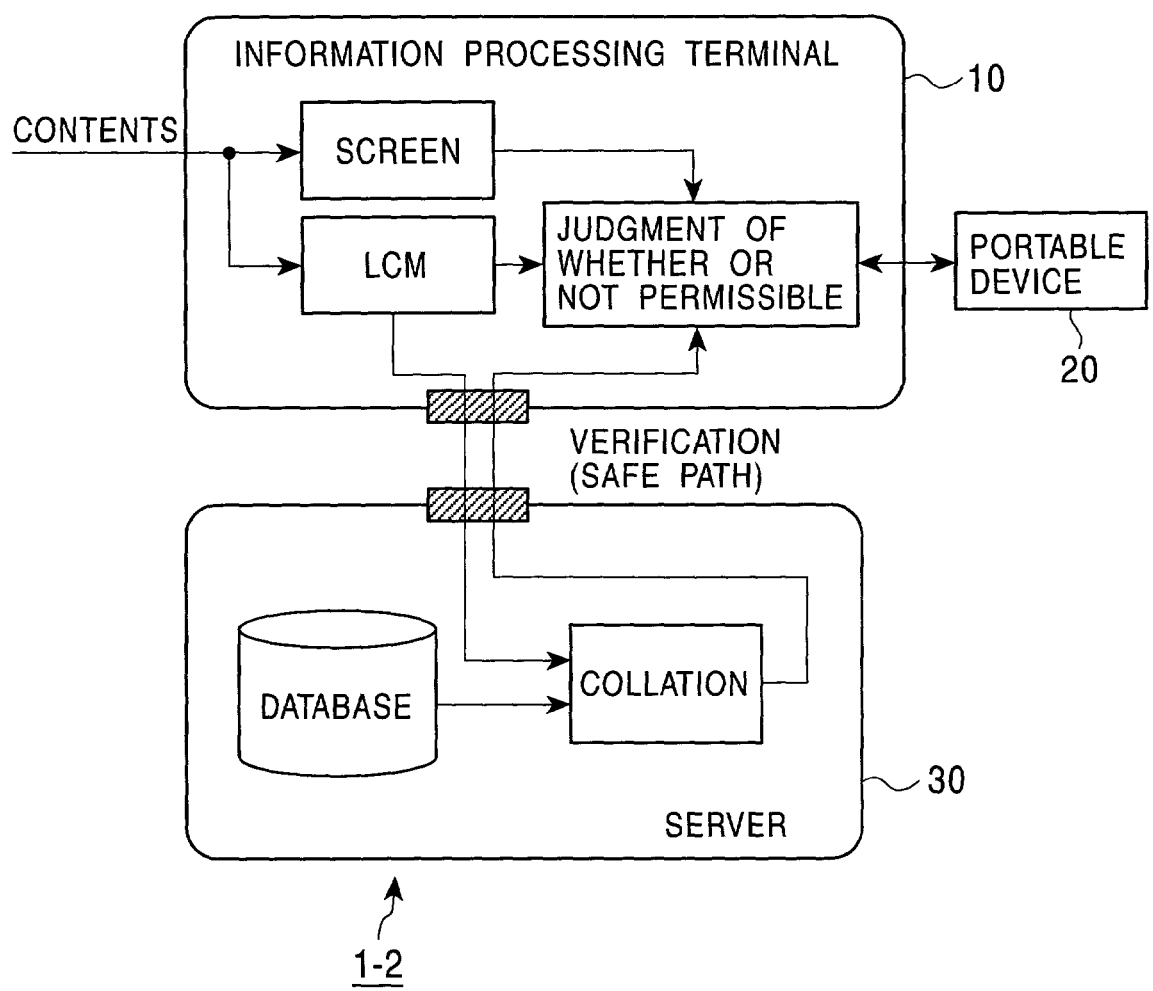
FIG. 9 is a diagram schematically illustrating the overall configuration of a contents copy managing system 1-2 wherein data in the bandwidth compression process with LCM can be used as collation data with the database.
Figure 10:
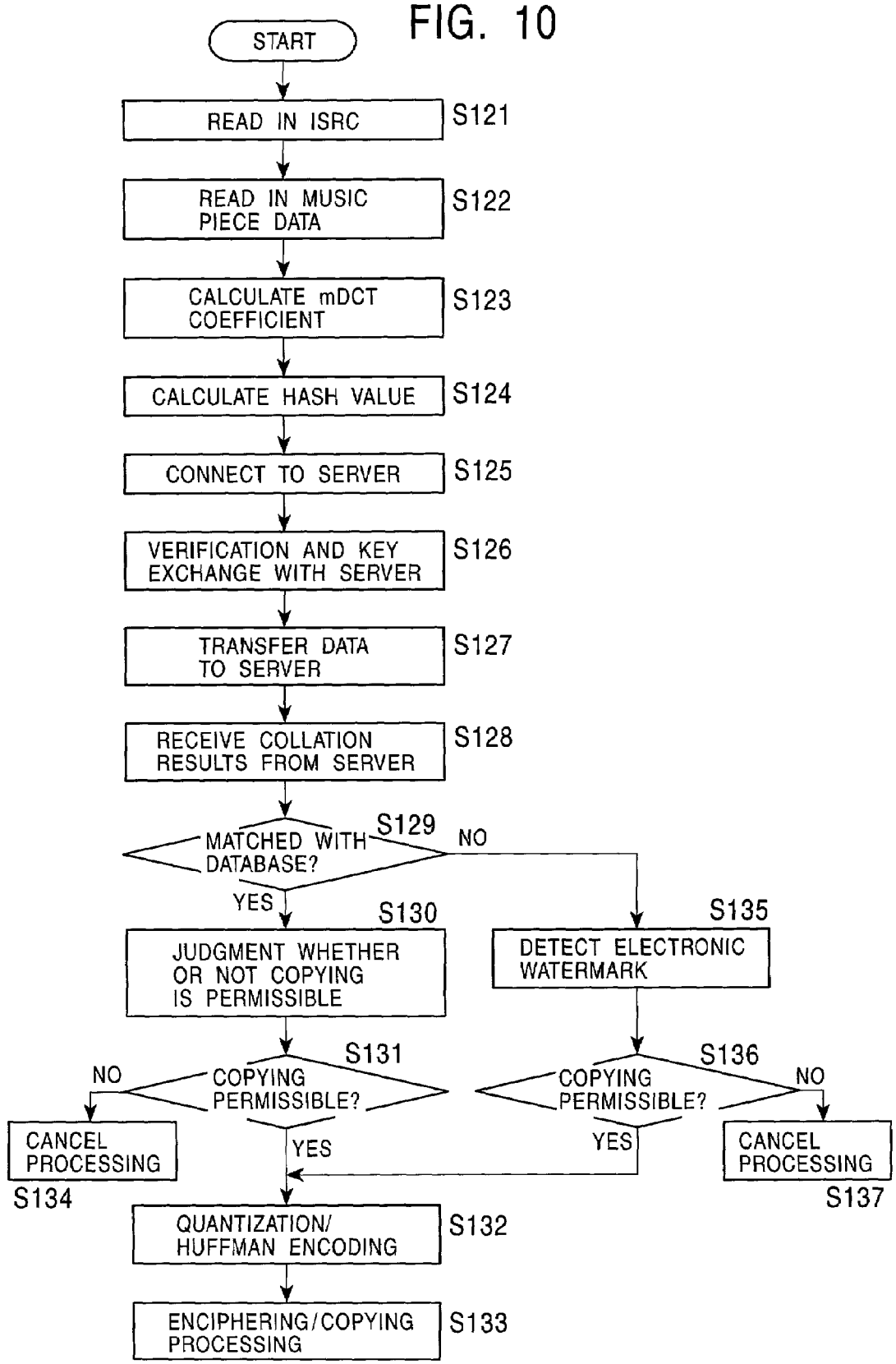
FIG. 10 is a flowchart illustrating the processing procedures executed by the information processing terminal 10 in the contents copy managing system 1-2.

FIG. 9 illustrates an example configuration of a contents copy managing system 1-2 wherein data in the bandwidth compression process with LCM can be used as collation data with the database, and FIG. 10 illustrates the processing procedures executed by the information processing terminal 10 in the contents copy managing system 1-2, in the form of a flowchart.

The data compression process is generally made up of DCT (Discrete Cosine Transform), quantization, and Huffman encoding. With bandwidth compression such as MP3 (MPEG-1 Audio Layer-III) or ATRAC, mDCT (Modified Discrete Cosine Transform) is used. mDCT is a type of orthogonal conversion, which converts a time-axial area into a frequency area. As for other types of orthogonal conversion besides mDCT, there are DCT, Wavelet (a waveform analyzing technology developed by Summus Limited of the USA), and so forth.

This contents copy managing system 1-2 is arranged such that the information processing terminal 10 obtains the hash value of an mDCT coefficient generated in the LCM process, which is transferred to the server 30 side for collation.

In the event that collation with the database shows that copying is permissible, compression and enciphering processing is continued without change, and data copying is made to the portable device 20. On the other hand, in the event that judgment is made that copying is not permissible, the flow returns to the screening process and electronic watermark detection is performed, and whether or not copying is permissible is judged again based on the detection results thereof.

According to the present embodiment, the information processing terminal 10 and perform compression of the data to be copied in a parallel manner even without the screening processing being completed, so the overall time required for the copying process is reduced. Also, even in the event that compressed and enciphered data is created for copying, there is no problem with contents protection so long as the data is not ultimately copied to the portable device 20 in the event that judgment is made that copying is not permissible. Also, data in the compresses process such as mDCT or the like generally has less data quantity than PCM (Pulse Code Modulation) data, and accordingly is suitable for collation data.

The processing procedures executed by the information processing terminal 10 will be described with reference to the flowchart shown in FIG. 10.

First, the ISRC or equivalent contents identification information is obtained from a CD mounted to a CD-ROM drive (not shown) (step S121).

Next, desired music piece data is read out from the CD, and is copied to a hard disk (not shown) within the terminal 10 (step S122).

Next, mDCT is executed as the first step of LCD processing, and the mDCT coefficient of the music piece data is calculated (step S123). Further, the hash function is multiplied by the mDCT coefficient, and the hash value thereof is calculated (step S124).

Next, connection is made to the server 30 to which inquiry is to be made (step S125), and further performing verification and key exchange with the server 30 (step S126) secures a safe communication path with the server 30.

Then, the information processing terminal 10 transfers the ISRC code read in step S121 and the hash value obtained in step S123 to the server 30 side, and requests an investigation of the CD (step S127).

In response to the CD investigation request, the server 30 side searches the database therein based on the ISRC code and judges whether or not the record exists therein, and further judges whether or not the hash value thereof matches, and returns the results thereof to the information processing terminal 10 (Step S128).

At the information processing terminal 10 side, judgment is made regarding whether or not copying to the portable device 20 is permissible or not, based on the response from the server 30 side.

In the event that the contents of the reply indicate that the record of interest exists within the database (step S129), this means that the CD mounted has been registered to the database and the data inserted by electronic watermark is known, so screening, i.e., the electronic watermark detection processing, can be omitted. In this case, only judgment whether or not copying is permissible from the CD is performed (steps S130, S131). In the event that the registered CD permits only one copy to be made, a check should be made in step S130 regarding whether or not the media mounted is a CD-R.

In the event that copying is permissible, the remaining processes of compression, which are quantization and Huffman encoding are performed (step S132). The compressed data is further enciphered, and then copying to the portable device 20 is executed (step S133). On the other hand, in the event that copying is not permissible, the flow proceeds to step S134, and the copying process is cancelled.

On the other hand, in the event that the judgment in step S129 indicates that the record of interest does not exist in the database at the server 30 side, i.e., that the CD mounted is not a registered CD, there is no other option but to perform screening, i.e., electronic watermark detection processing (step S135).

In the event that the results of electronic watermark detection and of judgment regarding whether or not copying is permissible indicate that copying is permissible, the remaining processes of compression processing, which are quantization and Huffman encoding are performed (step S132). The compressed data is further enciphered, and then copying to the portable device 20 is executed (step S133). On the other hand, in the event that copying is not permissible, the flow proceeds to step S137, and the copying process is cancelled.

The music data copying functions on a information processing terminal 10 such as described above may be performed by a terminal device comprising dedicated hardware, but the present invention can also be installed on a common calculator system capable of general-purpose processing in the form of a contents copy application described in a computer-readable format for executing the processing procedures shown in the flowcharts in FIGS. 3, 5, 7, and 10.

Figure 11:
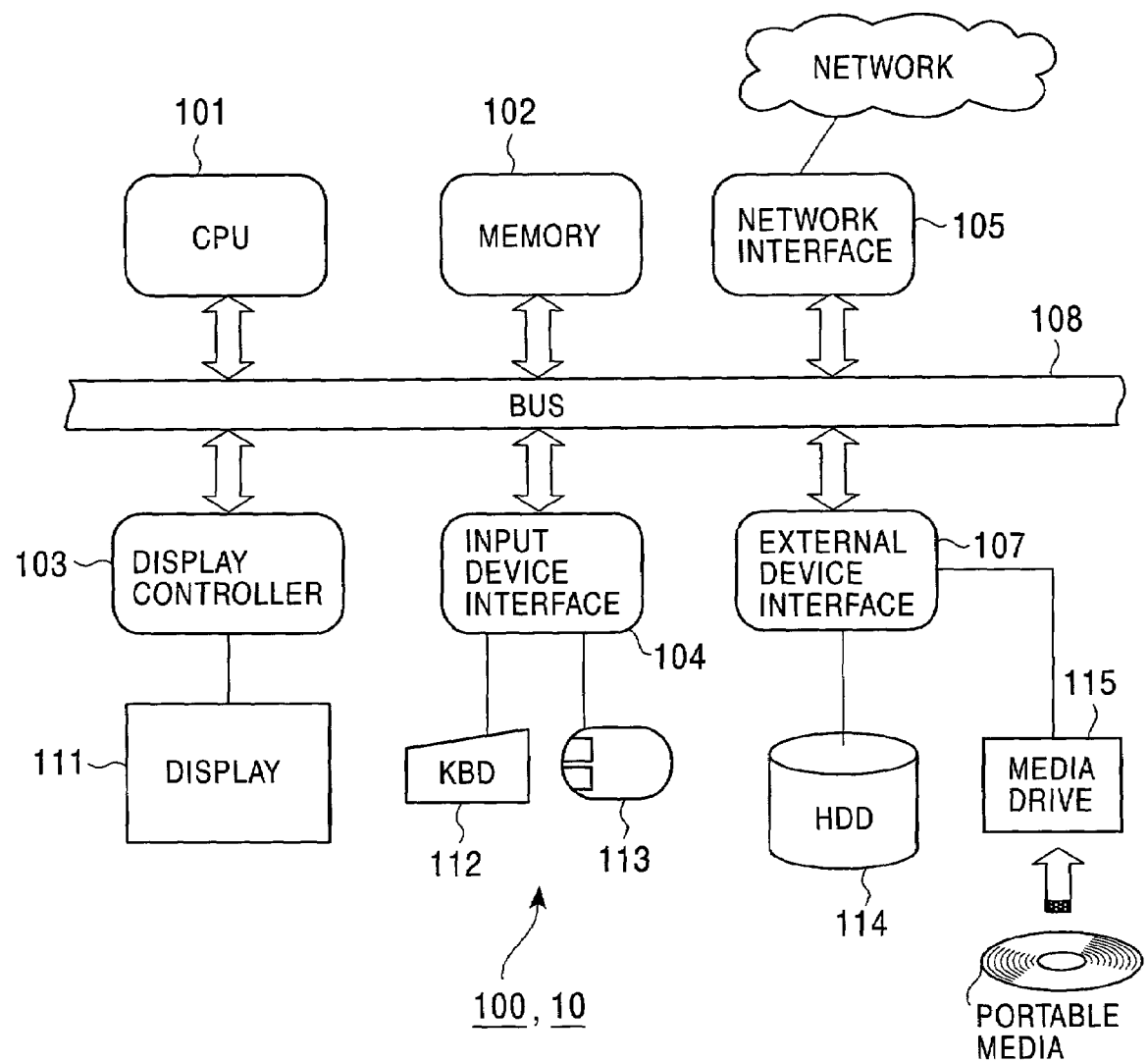
FIG. 11 is a systematic representation of the configuration of a calculator system 100 applicable as the information processing terminal 10.

FIG. 11 is a systematic representation of the configuration of a calculator system 100 capable of realizing the information processing terminal 10 according to the present invention. The components of the system 100 will now be described with reference to the figure.

The CPU (Central Processing Unit) 101 which is the main controller of the system 100 executes various types of applications under control of an operating system. The CPU 101 can, for example, execute a contents copy application wherein the processing procedures shown in the flowcharts in FIGS. 3, 5, 7, and 10 are described in a computer-readable format. As shown in the figure, the CPU 101 is mutually connected with other equipment (described later) via a bus 108.

Memory 102 serves as a storing device used for storing program code to be executed by the CPU 101, or temporarily saving work data being executed by the program. The memory 102 shown in the figure should be understood to include both non-volatile memory and volatile memory.

A display controller 103 is provided to serve as a dedicated controller for actually processing drawing commands issued by the CPU 101. The drawing data processed by the display controller 103 is temporarily written to a frame buffer (not shown) for example, and then output to a screen by a display 111.

An input device interface 104 is provided to serve as a device for connecting user input devices such as a keyboard 112, mouse 113, etc., to the calculator system 100.

A network interface 105 is provided to connect the system 100 to local networks such as a LAN (Local Area Network) and further to wide-area networks such as the Internet, according to predetermined communication protocols such as Ethernet or the like.

On the network, multiple host terminals (not shown) are connected in a transparent state, thus realizing the architecture for a dispersed computing environment. The calculator system 100 and the server 30 can be connected via network, thereby making database inquiry to the server 30. Also, software programs, data contents, and the like, can be distributed over the network. For example, contents copy applications, wherein the processing procedures shown in the flowcharts in FIGS. 3, 5, 7, and 10 are described in a computer-readable format, can be downloaded to the calculator system 100 via network.

An external device interface 107 is provided to serve as a device for connecting external devices such as a hard disk drive (HDD) 114, media drive 115, etc., to the system 100.

The HDD 114 is an external storage device with a magnetic disk serving as a storage carrier fixedly mounted therein (a known art), and is superior to other external storage devices from the perspective of storage capacity, data transfer speed, and so forth. Placing software programs on the HDD 114 in a computer-executable manner is referred to as "installing" the programs. Normally, the program code for the operating system, application programs, device drivers, etc., to be executed by the CPU 101, are stored therein in a non-volatile manner.

For example, contents copy applications wherein the processing procedures shown in the flowcharts in FIGS. 3, 5, 7, and 10 are described in a computer-readable format can be installed on the HDD 114. Also, music data to be copied can be temporarily saved on the HDD 114. Music data read out from recording media such as CDs is saved on the HDD 114 as, for example, WAV format computer files.

The media drive 115 is a device to which portable media such as CDs (Compact Disks), MOs (Magneto-Optical disks), DVDs (Digital Versatile Disks), etc., are loaded, thereby accessing the data recording surface(s) thereof.

Portable media is mainly used to backup software programs or data files or the like as data in computer-readable formats, and to move these between systems (which includes selling and distributing). For example, contents copy applications wherein the processing procedures shown in the flowcharts in FIGS. 3, 5, 7, and 10 are described in a computer-readable format can be physically distributed between multiple devices using such portable media. Also, music data to be copied can be physically distributed between multiple devices using such portable media.

An example of a calculator system 100 such as shown in FIG. 11 is an IBM personal computer "PC/AT (Personal Computer/Advanced Technology)" compatible model or a later model thereof, for example. Of course, computers with other architectures can be applied to the calculator system 100 according to the present embodiment.

Also, though the above-described music data copy control functions and vicarious electronic watermark detecting functions performed by the server 30 may be realized by a terminal device having a dedicated hardware configuration, the present invention can also be realized by executing contents copy control and vicarious electronic watermark detecting server applications wherein the processing procedures shown in the flowcharts in FIGS. 4, 6, and 8 are described in a computer-readable format.

Figure 12:
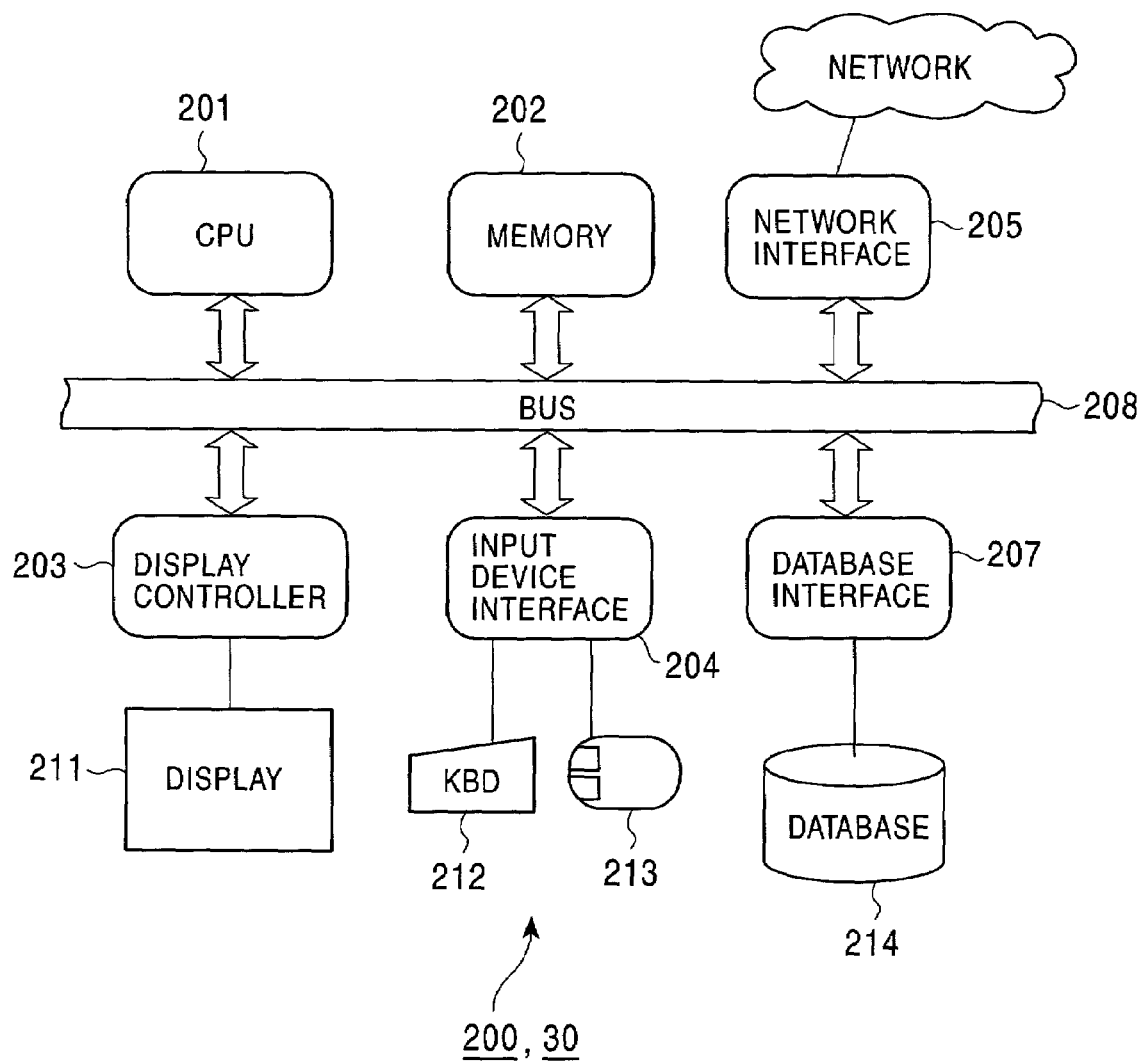
FIG. 12 is a systematic representation of the configuration of a calculator system 200 applicable as the server 30.

FIG. 12 is a systematic representation of the hardware configuration of a calculator system 200 which can realize the server 30 according to the present invention. The components of the system 200 will now be described with reference to the figure.

The CPU (Central Processing Unit) 201 which is the main controller of the system 200 executes various types of applications under control of an operating system. The CPU 201 can, for example, execute a contents copy application wherein the processing procedures shown in the flowcharts in FIGS. 4, 6, and 8 are described in a computer-readable format. As shown in the figure, the CPU 201 is mutually connected with other equipment (described later) via a bus 208.

Memory 202 serves as a storing device used for storing program code to be executed by the CPU 201, or temporarily saving work data being executed by the program. The memory 202 shown in the figure should be understood to include both non-volatile memory and volatile memory.

A display controller 203 is provided to serve as a dedicated controller for actually processing drawing commands issued by the CPU 201. The drawing data processed by the display controller 203 is temporarily written to a frame buffer (not shown) for example, and then output to a screen by a display 211.

An input device interface 204 is provided to serve as a device for connecting user input devices such as a keyboard 212, mouse 213, etc., to the calculator system 200.

A network interface 205 is provided to connect the system 200 to local networks such as a LAN (Local Area Network) and further to wide-area networks such as the Internet, according to predetermined communication protocols such as Ethernet or the like.

On the network, multiple host terminals (not shown) are connected in a transparent state, thus realizing the architecture for a dispersed computing environment. The calculator system 200 and the information processing terminal 10 can be connected via network, thereby receiving database inquiries from the information processing terminal 10. Also, software programs, data contents, and the like, can be distributed over the network. For example, contents copy applications and vicarious electronic watermark detecting server applications wherein the processing procedures shown in the flowcharts in FIGS. 4, 6 and 8 are described in a computer-readable format, can be downloaded to the calculator system 200 via network. Further, music data to be copied and the like can be distributed via network.

An external device interface 207 is provided to serve as a device for connecting external devices such as a hard disk drive (HDD) 214 for configuring a database to the system 200.

The HDD 214 is an external storage device with a magnetic disk serving as a storage carrier fixedly mounted therein (a known art), and is superior to other external storage devices from the perspective of storage capacity, data transfer speed, and so forth. Placing software programs on the HDD 214 in a computer-executable manner is referred to as "installing" the programs. Normally, the program code for the operating system, application programs, device drivers, etc., to be executed by the CPU 201, are stored therein in a nonvolatile manner. For example, contents copy applications wherein the processing procedures shown in the flowcharts in FIGS. 4, 6, and 8 are described in a computer-readable format can be installed on the HDD 214.

An example of a calculator system 200 such as shown in FIG. 12 is an IBM personal computer "PC/AT (Personal Computer/Advanced Technology)" compatible model or a later model thereof, for example. Of course, computers with other architectures can be applied to the calculator system 200 according to the present embodiment.

The present invention has so far been described with reference to specific embodiments. However, it is selfevident that those skilled in the art can make variations and substitutions of the embodiments without departing from the spirit and scope of the present invention.

Though the embodiments have been described with reference to an example wherein music data recorded on a CD is to be copied, the applicable range of the present invention is by no means restricted to this; rather, the present invention exhibits similar advantages for other data contents such as pictures or still images, and for data read from other recording media such as DVDs or MDs.

That is to say, the above description of the present invention has been a illustrative disclosure of the present invention, and is not be to interpreted restrictively. Any interpretations of the essence of the present invention should take the appended claims into consideration.

Thus, according to the present invention, an excellent electronic watermark detecting technology, capable of detecting electronic watermarks embedded in contents, can be provided. Also, an excellent electronic watermark detecting technology, capable of judging whether or not duplicating contents is permissible, according to detected electronic watermarks embedded in the contents, can be provided. Further, an excellent electronic watermark detecting technology, capable of vicariously performing electronic watermark inspecting processing with heavy computation loads, so as to judge whether or not duplicating contents is permissible, thereby reducing the time required for the overall copying operation, can be provided.

The present invention has been arranged such that the calculator system for performing duplication of contents does not necessarily perform screening, i.e., electronic watermark detection, with contents copy control information being obtainable by other means. For example, in the event of copying a CD regarding which it is known beforehand that there is no electronic watermark inserted in the contents, the electronic watermark detection processing itself can be skipped as long as the CD can be confirmed to be such, thereby reducing the amount of time necessary for copying.

That is to say, there is no need to detect electronic watermarks from the data, so processing time is reduced, and ease of use improves.

Also, even with cases of detecting electronic watermarks, there is no need to perform detection over the entirety of the contents, (e.g., music piece), so processing time is reduced, and ease of use improves.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for managing the copying of contents to external equipment, said system comprising:
   a first reader operable to read in contents to be copied;
   a second reader operable to read in identification information of said contents;
   a database operable to store electronic watermark information corresponding to each of said contents;
   a collation unit operable to receive said identification information from said second reader, to search said database based on said identification information and to create a collation result indicating whether a matching record exists in said database;
   an electronic watermark inspecting unit operable to inspect electronic watermarks inserted into said contents and to produce inspection results; and
   a controller operable to control copying of said contents to the external equipment based on said collation result;
   wherein in the event said collation result indicates a matching record exists, said controller controls copying according to the content of said matching record, and in the event said collation result indicates a matching record does not exist, said controller controls copying according to said inspection results.

2. The system according to claim 1, further comprising:
a third reader operable to read in attribute information of said contents,
wherein said collation unit is further operable to receive said attribute information from said third reader, and to search said datbase on at least one of said identification information and said attribute information of said contents.

3. A system according to claim 2, wherein said attribute information is data comprising at least a part of said contents that has been clipped.

4. A system according to claim 2, wherein said attribute information is a hash value for at least a part of said contents.

5. A system according to claim 2, wherein said attribute information is selected from a characteristic value and a characteristic quantity relating to said contents.

6. A system according to claim 1 or 2, wherein said controller is operable to compress and encipher said contents and to then copy said contents to the external equipment.

7. A system according to claim 1 or 2, wherein said controller and said database are connected to one another via a safe communication path.

8. A method for managing copying of contents to external equipment, comprising:
reading in contents to be copied;
reading in identification information of said contents;
maintaining a database of electronic watermark information corresponding to each of said contents;
searching said database based on said identification information of said contents to create a collation result indicating whether a matching record exists in said database; and
in the event said collation result indicates a matching record exists in said database, controlling copying according to the content of said matching record, and, in the event said collation result indicates a matching record does not exist in said database, inspecting said contents for an electronic watermark inserted therein to produce inspection results, and controlling copying according to said inspection results.

9. A method according to claim 8, further comprising:
reading in attribute information of said contents, wherein said searching step includes searching said database based o n at least one of said identification information and said attribute information of said contents to produce said collation result.

10. A method according to claim 9, wherein said attribute information is data comprising at least a part of said contents that has been clipped.

11. A method according to claim 9, wherein said attribute information is a has value for at least a part of said contents.

12. A method according to claim 9, wherein said attribute information is selected from a characteristic value and a characteristic quantity relating to said contents.

13. A method according to claim 8, or 9, wherein said steps of controlling copying include compressing and enciphering said contents and then copying said contents to the external equipment.

14. A method according to claim 8 or 9, wherein said database searching step is performed via a safe communication path.

15. An information processing device for executing copying of contents to external equipment, said device comprising:
a first reader operable to read in contents to be copied;
a second reader operable to read in identification information of said contents;
an electronic watermark inspecting unit operable to inspect electronic watermarks inserted into said contents and to produce inspection results; and
a database operable to store electronic watermark information corresponding to each of said contents;
a collation unit operable to receive said identification information from said second reader, to make inquiry to said database based on said identification information, and to produce an inquiry result; and
a controller operable to communicate with said collation unit, to control copying of said contents according to the inquiry result and, according to the inquiry result, to either execute copying of said contents, or inspect said contents with said electronic watermark inspecting unit and control copying according to said inspection results.

16. An information processing device according to claim 15, further comprising:
a third reader operable to read in attribute information of said contents,
wherein said collation unit is further operable to receive said attribute information from said third reader, and to make inquiry to search said database based on at least one of said identification information and said attribute information of said contents.

17. An information processing device according to claim 16, wherein said attribute information is data comprising at least a part of said contents that has been clipped.

18. An information processing device according to claim 16, wherein said attribute information is a hash value for at least a part of said contents.

19. An information processing device according to claim 16, wherein said attribute information is selected from a characteristic value and a characteristic quantity relating to said contents.

20. An information processing device according to claim 15 or 16, wherein said controller is operable to compress and encipher said contents and to copy said contents to the external equipment.

21. An information processing device according to claim 15 or 16, wherein the communication between said controller and said collation unit is made via a safe communication path.

22. A method for executing copying of contents to external equipment, comprising:
reading in contents to be copied;
reading in identification information of said contents;
making inquiry to an external server based on said identification information of said contents to obtain an inquiry result, said external server storing electronic watermarrk information corresponding to each of said contents; and
according to the inquiry results, either executing copying of said contents, or inspecting said contents for an electronic watermark inserted therein to produce inspection results, and controlling copying according to said inspection results.

23. A method according to claim 22, further comprising:
reading in attribute information of said contents, wherein said step of making inquiry includes making inquiry to said external server based on at least one of said identification information and said atribute information of said contents.

24. An information processing method according to claim 23, wherein said attribute information is data comprising at least a part of said contents that has been clipped.

25. An information processing method according to claim 23, wherein said attribute information is a hash value for at least a part of said contents.

26. An information processing method according to claim 23, wherein said attribute information is selected from a characteristic value and a characteristic quantity relating to said contents.

27. An information processing method according to claim 22 or 23, wherein said steps of executing copying of said contents and controlling copying of said contents include compressing and enciphering said contents and then copying said contents to the external equipment.

28. An information processing method according to claim 22 or 23, wherein said inquiry to said external server is made via a safe communication path.

29. A recording medium recorded with a computer readable program for managing copying of contents to external equipment, said program comprising:
reading in contents to be copied;
reading in identification information of said contents;
maintaining a database of electronic watermark information corresponding to each of said contents;
searching said database based on said identification information of said contents to create a collation result indicating whether a matching record exists in said database; and
in the event said collation result indicates a matching record exists in said database, controlling copying according to the content of said matching record, and, in the event said collation result indicates a matching record does not exist in said database, inspecting said contents for an electronic watermark inserted therein to produce inspection results, and controlling copying according to said inspection results.

30. A recording medium according to claim 29, wherein said program further comprises:
reading in attribute information of said contents,
said collation unit being further operable to receive said attribute information, and to search said database based on at least one of said identification information and said attribute information of said contents.

31. A recording medium according to claim 30, wherein said attribute information is data comprising at least a part of said contents that has been clipped.

32. A recording medium according to claim 30, wherein said attribute information is a hash value for at least a part of said contents.

33. A recording medium according to claim 30, wherein said attribute information is selected from a characteristic value and a characteristic quantity relating to said contents.

34. A recording medium recorded with a computer readable program for executing copying of contents to external equipment, said program comprising:
reading in contents to be copied;
reading in identification information of said contents;
making inquiry to an external server based on said identification information of said contents to obtain an inquiry result, said external server storing electronic watermark information corresponding to each of said contents; and
according to the inquiry result, either executing copying of said contents, or inspecting said contents for an electronic watermark inserted therein to produce inspection results, and controlling copying according to said inspection results.

35. A recording medium according to claim 34, wherein said program further comprises:
reading in attribute information of said contents, and said step of making an inquiry includes making inquiry to the database based on at least one of said identification information and said attribute information of said contents.

36. A recording medium according to claim 35, wherein said attribute information is data comprising at least a part of said contents that has been clipped.

37. A recording medium according to claim 35, wherein said attribute information is a hash value for at least a part of said contents.

38. A recording medium according to claim 35, wherein said attribute information is selected from a characteristic value and a characteristic quantity relating to said contents.

* * * * *

UNITED STATES PATENT AND TRADEMARK OFFICE
CERTIFICATE OF CORRECTION

PATENT NO. : 7,188,247 B2
APPLICATION NO. : 09/870207
DATED : March 6, 2007
INVENTOR(S) : Tadashi Ezaki, Jun Hirai and Hideo Sato It is certified that error appears in the above-identified patent and that said Letters Patent is hereby corrected as shown below:

Column 1, line 1, before "SYSTEM" insert --A--.
Column 21, line 59, "selfevident" should read --self-evident--.
Column 23, line 9, "datbase" should read --database based--.
Column 23, line 47, "o n" should read --on--.
Column 23, line 54, "has value" should read --hash value--.

Signed and Sealed this

Third Day of June, 2008

JON W. DUDAS
*Director of the United States Patent and Trademark Office*